(12) United States Patent
Wu et al.

(10) Patent No.: US 11,920,639 B2
(45) Date of Patent: Mar. 5, 2024

(54) VEHICLE CLUTCH

(71) Applicant: TAIAN SHENGTAI AUTO PARTS CO., LTD., Tai'an (CN)

(72) Inventors: Xiaoqin Wu, Tai'an (CN); Chuanchang Zhao, Tai'an (CN); Hsingchang Kuo, Tai'an (CN); Defu Xue, Tai'an (CN)

(73) Assignee: TAIAN SHENGTAI AUTO PARTS CO., LTD., Tai'an (CN)

( * ) Notice: Subject to any disclaimer, the term of this patent is extended or adjusted under 35 U.S.C. 154(b) by 0 days.

(21) Appl. No.: 17/763,838

(22) PCT Filed: Dec. 21, 2020

(86) PCT No.: PCT/CN2020/137891
§ 371 (c)(1),
(2) Date: Mar. 25, 2022

(87) PCT Pub. No.: WO2021/129553
PCT Pub. Date: Jul. 1, 2021

(65) Prior Publication Data
US 2022/0341471 A1 Oct. 27, 2022

(30) Foreign Application Priority Data
Dec. 25, 2019 (CN) .......................... 201911355968.5

(51) Int. Cl.
*F16D 23/02* (2006.01)
*F16D 13/56* (2006.01)
(Continued)

(52) U.S. Cl.
CPC ........... *F16D 23/025* (2013.01); *F16D 13/56* (2013.01); *F16D 21/06* (2013.01); *F16D 23/06* (2013.01);
(Continued)

(58) Field of Classification Search
None
See application file for complete search history.

(56) References Cited

U.S. PATENT DOCUMENTS 7,246,692 B2   7/2007   Braford

FOREIGN PATENT DOCUMENTS

CN   1922414 A     2/2007
CN   103332102 A   10/2013
(Continued)

OTHER PUBLICATIONS

International Search Report and Written Opinion for PCT/CN2020/137891; Application Filing Date Dec. 21, 2020; dated Mar. 23, 2021 (12 pages).

*Primary Examiner* — Timothy Hannon
(74) *Attorney, Agent, or Firm* — CANTOR COLBURN LLP

(57) ABSTRACT

A vehicle clutch, comprising a primary clutch (1). A first drive (2) and a second drive (3) are provided on the other side of the primary clutch (1); the primary clutch (1) is internally provided with a first secondary clutch unit and a second secondary clutch unit; the first drive (2) is in power connection with the first secondary clutch unit; the second drive (3) is in power connection with the second secondary clutch unit; the first secondary clutch unit comprises a first secondary clutch (4) and a friction unit (5) configured to cooperate with the first secondary clutch (4); the second secondary clutch unit comprises a second secondary clutch (6) and a friction unit (5) configured to cooperate with the second secondary clutch (6); a synchronizer (7) is also provided between the first secondary clutch (4) and the second secondary clutch (6); the synchronizer (7) is configured to lock the first secondary clutch (4) and the second secondary clutch (6) as a whole when the first secondary clutch (4) is separated from the second secondary clutch (6).

(Continued)

The provision of the two-stage clutch units enables the vehicle clutch to choose whether to use one single clutch or two clutches to bear the torque according to different working conditions.

8 Claims, 2 Drawing Sheets

(51) Int. Cl.
  *F16D 21/06* (2006.01)
  *F16D 23/06* (2006.01)
  *F16D 23/12* (2006.01)
(52) U.S. Cl.
  CPC ............... *F16D 2021/0676* (2013.01); *F16D 2023/123* (2013.01)

(56) References Cited

FOREIGN PATENT DOCUMENTS

| | | |
|---|---|---|
| CN | 204327915 U | 5/2015 |
| CN | 103649600 B | 9/2015 |
| CN | 111075852 A | 4/2020 |
| CN | 111075856 A | 4/2020 |
| CN | 212177707 U | 12/2020 |
| CN | 212177710 U | 12/2020 |
| DE | 3812359 A1 | 7/1989 |

VEHICLE CLUTCH

CROSS REFERENCE TO RELATED APPLICATIONS

This application is a National Stage application of PCT/CN2020/137891, filed Dec. 21, 2020, which claims the benefit of CN Application No. 201911355968.5, filed Dec. 25, 2019, both of which are incorporated by reference in their entirety herein.

TECHNICAL FIELD

The present application relates to a vehicle clutch.

BACKGROUND

A single clutch of a conventional dual-clutch automatic transmission is used to bear all the torque of a power source. For example, if the peak torque of a motor is 200 N-m, then the bearing capacity of the single clutch is 200 N-m. There are also some methods to lock the two clutches at present, but the reliability of the locking structure is poor, the operation is inconvenient, and the practicability is far from meeting the requirements.

At the present stage, a lock ring type inertial synchronizer is generally used to keep a gear ring and a lock ring synchronized through a friction force, however, this method is inconvenient to operate for the combination of a vehicle clutch, and has a plurality of disadvantages during the engagement and disengagement of the vehicle clutch.

SUMMARY

In order to solve the above problems, the present application provides a vehicle clutch including a primary clutch, wherein a first drive and a second drive are provided on the other side of the primary clutch, the primary clutch is internally provided with a first secondary clutch unit and a second secondary clutch unit, the first drive is in power connection with the first secondary clutch unit, the second drive is in power connection with the second secondary clutch unit; the first secondary clutch unit includes a first secondary clutch and a friction unit configured to cooperate with the first secondary clutch; the second secondary clutch unit includes a second secondary clutch and a friction unit configured to cooperate with the second secondary clutch, a synchronizer is also provided between the first secondary clutch and the second secondary clutch; the synchronizer is configured to lock the first secondary clutch and the second secondary clutch as a whole when the first secondary clutch is separated from the second secondary clutch. The provision of the two-stage clutch units enables the vehicle clutch to choose whether to use one single clutch or two clutches to bear the torque according to different working conditions. When the vehicle clutch is used, one secondary clutch is generally used to bear the rated torque, in the state of peak torque, the two clutches are locked by the synchronizer, so as to better bear the peak torque, and after the clutches are locked, the synchronism between the two clutches is better and the reliability of the two clutches bearing the peak torque is enhanced.

Preferably, at least one of the friction unit of the first secondary clutch includes a clutch friction plate and a steel plate fixedly connected to the primary clutch and the friction unit of the second secondary clutch includes a clutch friction plate and a steel plate fixedly connected to the primary clutch.

Preferably, the first secondary clutch includes a first horizontal plate connected to the clutch friction plate, and the first horizontal plate is connected to a first connecting plate through a first horizontal plate; the second secondary clutch includes a second horizontal plate connected to the clutch friction plate, and the second horizontal plate is connected to a second connecting plate through a second vertical plate; the first connecting plate is provided with a first clamping ring, the second connecting plate is provided with a second clamping ring, and the synchronizer is arranged on one side of the first clamping ring and the second clamping ring; the synchronizer includes a synchronizing ring, the side part of the synchronizing ring is provided with a return ring, and the return ring is configured to abut against the second vertical plate through an elastic piece; the first clamping ring and the second clamping ring are configured to adjacently abut against the synchronizer; the elastic piece is arranged between the return ring and the second vertical plate; the elastic piece is a spring; a side joint ring is arranged on the second connecting plate, and the side joint ring is connected with the second clamping ring; the synchronizer is provided with splines, and the first clamping ring and the second clamping ring are provided with clamping keys configured to be clamped with the splines; the clamping keys are provided with conical teeth arranged obliquely. Through the engagement of the splines and the conical teeth and the cooperation with the spring, the secondary clutch part of the vehicle clutch can complete the combination of the first secondary synchronizer and the second secondary synchronizer under the action of the spring when the vehicle clutch is not engaged, and can complete the return operation of the synchronizer under the rotation of the vehicle clutch when the vehicle clutch is engaged.

Preferably, the first drive includes a first release lever, the first release lever is configured to cooperate with a first release bearing, the first release bearing is connected with a first connecting rod, and the first connecting rod penetrates through the primary clutch and is connected with the first secondary clutch.

Preferably, the first connecting rod includes a first vertical separation rod connected with the first release bearing, the first vertical separation rod is connected with a first transverse separation rod extending in the moving direction of the first vertical separation rod, the first transverse separation rod is connected with a first transmission separation rod, the first transmission separation rod is configured to penetrate through the primary clutch, and the first transmission separation rod is connected with the first secondary clutch.

Preferably, the first transverse separation rod is embedded in the primary clutch.

Preferably, the second drive includes a second release lever, the second release lever is configured to cooperate with a second release bearing, the second release bearing is connected with a second connecting rod, and the second connecting rod penetrates through the primary clutch and is connected with the second secondary clutch.

Preferably, the second connecting rod includes a second vertical separation rod connected with the second release bearing, the second vertical separation rod is connected with a second transverse separation rod extending in the moving direction of the second vertical separation rod, the second transverse separation rod is connected with a second transmission separation rod, the second transmission separation rod is configured to penetrate through the primary clutch, and the second transmission separation rod is connected with the second secondary clutch.

Preferably, the second transverse separation rod is embedded in the primary clutch. In the present application, a transmission mechanism is arranged on the outer surface of the primary clutch to transmit the action of the first drive and the second drive to the interior of the primary clutch, so as to realize the action of the clutch, and the primary clutch here not only is a functional component, but also can protect the internal regulating components, realize the integrated structure, reduce the manufacturing cost, and improve the reliability of the structure.

Preferably, the vehicle clutch further includes a clutch pressure plate, the clutch pressure plate is configured to abut against the second secondary clutch unit, and a pressure spring is arranged between the clutch pressure plate and the primary clutch.

The present application can bring the following beneficial effects:

1, the provision of the two-stage clutch units enables the vehicle clutch to choose whether to use one single clutch or two clutches to bear the torque according to different working conditions. When the vehicle clutch is used, one secondary clutch is generally used to bear the rated torque, in the state of peak torque, the two clutches are locked by the synchronizer, so as to better bear the peak torque, and after the two clutches are locked, the synchronism between the two clutches is better and the reliability of the two clutches bearing the peak torque is enhanced;
2, through the engagement of the splines and the conical teeth and the cooperation with the spring, the secondary clutch part of the vehicle clutch can complete the combination of the first secondary synchronizer and the second secondary synchronizer under the action of the spring when the vehicle clutch is not engaged, and can complete the return operation of the synchronizer under the rotation of the vehicle clutch when the vehicle clutch is engaged;
3, a transmission mechanism is arranged on the outer surface of the primary clutch to transmit the action of the first drive and the second drive to the interior of the primary clutch, so as to realize the action of the clutch, and the primary clutch here not only is a functional component, but also can protect the internal regulating components, realize the integrated structure, reduce the manufacturing cost, and improve the reliability of the structure.

BRIEF DESCRIPTION OF THE DRAWINGS

The drawings described herein are used to provide a further understanding of the present application and constitute a part of the present application. The schematic embodiments and description thereof are used for explaining the present application and do not limit the present application improperly. In the drawings.

DETAILED DESCRIPTION OF THE PREFERRED EMBODIMENTS

Figure 1:
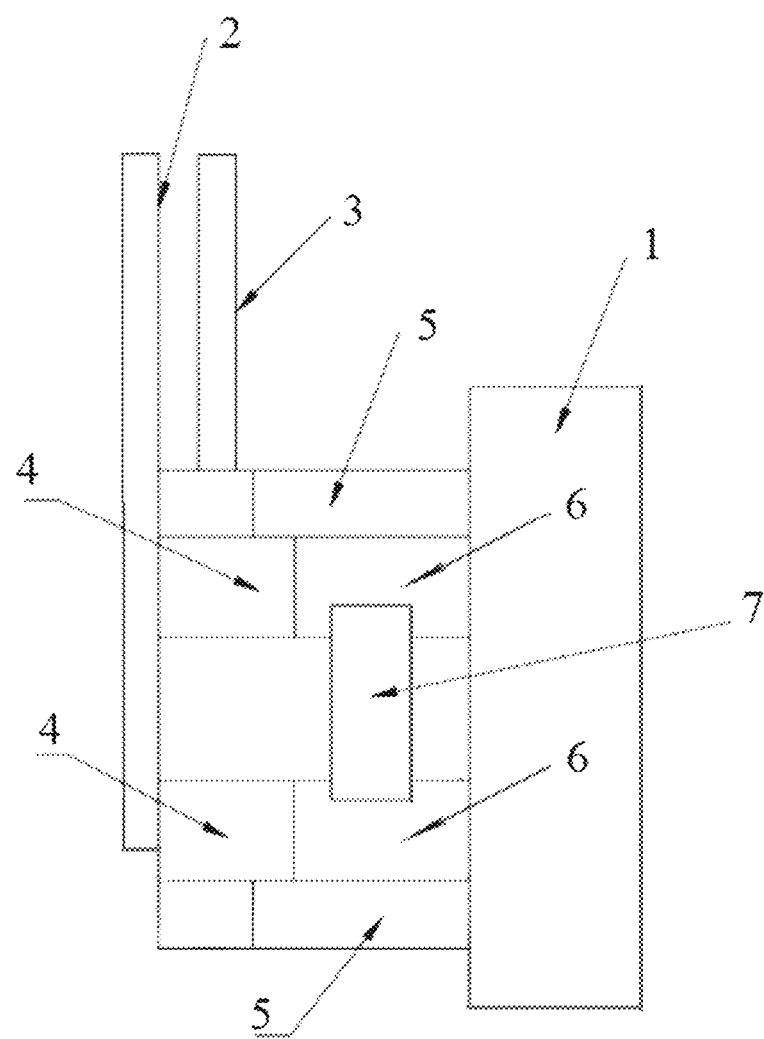
FIG. 1 is a principle structural schematic diagram of the present application.

In order to clearly illustrate the technical features of the solution, detailed description will be made to the present application below in combination with accompanying drawings by way of specific implementations.

As shown in the figures, in order to explain the overall idea of this application more clearly, a detailed description will be given below by way of example in combination with the accompanying drawings of the description.

In addition, in the description of this application, it should be understood that the terms "center", "upper", "lower", "front", "rear", "left", "right", "vertical", "horizontal", "top", "bottom", "inner", "outer", "axis", "radial", "circumferential" indicate the orientation or position relationship based on the orientation or position relationship shown in the drawings, are only for facilitating description of the present application and simplifying the description, rather than indicating or implying that the device or element referred to must have a specific orientation, be constructed and operated in a specific orientation, and thus shall not be construed as a limitation of this application.

Embodiments in this description are described progressively, the same and similar parts between the various embodiments can be referred to each other, and each embodiment focuses on the differences from other embodiments.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include one or more of the features. In the description of this application, "multiple" means two or more, unless otherwise expressly and specifically defined.

In the present application, unless otherwise specified and defined, the terms "installation", "connected", "connection", "fixation" and other terms shall be understood in a broad sense, for example, connection may be fixed connection, detachable connection or integrated connection; connection may be mechanical connection, electrical connection or communication; connection may be direct connection or indirect connection through an intermediate medium; connection may be internal communication of two elements or the interaction relationship between two elements. For those skilled in the art, the specific meaning of the above terms in the present application can be understood according to the specific circumstances.

In the present application, unless otherwise expressly specified and defined, the first feature is "above" or "below" the second feature may be that the first feature is in direct contact with the second feature, or the first feature is in indirect contact with the second feature through an intermediate medium. In the description of this description, the description referring to the terms "one embodiment", "some embodiments", "examples", "specific examples", or "some examples" means that the specific features, structures, materials or features described in connection with the embodiments or examples are included in at least one embodiment or example of the present application. In this description, the schematic expression of the above terms does not have to be for the same embodiments or examples. Further, the specific features, structures, materials or features described may be combined in any one or more embodiments or examples in a suitable manner.

In the first embodiment, as shown in FIG. 1, a vehicle clutch includes a primary clutch 1, wherein a first drive 2 and a second drive 3 are provided on the other side of the primary clutch 1, the primary clutch 1 is internally provided with a first secondary clutch unit and a second secondary clutch unit, the first drive 2 is in power connection with the first secondary clutch unit, the second drive 3 is in power connection with the second secondary clutch unit; the first secondary clutch unit includes a first secondary clutch 4 and a friction unit 5 configured to cooperate with the first secondary clutch 4; the second secondary clutch unit includes a second secondary clutch 6 and a friction unit 5 configured to cooperate with the second secondary clutch 6, a synchronizer 7 is also provided between the first secondary clutch 4 and the second secondary clutch 6; the synchronizer 7 is configured to lock the first secondary clutch 4 and the second secondary clutch 6 as a whole when the first secondary clutch 4 is separated from the second secondary clutch 6.

When the vehicle clutch is used, the first drive 2 and/or the second drive 3 are/is triggered manually or automatically, the first drive 2 drives the second secondary clutch unit, and the second drive 3 drives the second secondary clutch unit. Under the condition that a specified condition is met, the synchronizer 7 locks or combines the two secondary clutches. The specified condition may be that after the torque reaches a certain value, the synchronizer 7 is electrically controlled to act to combine the two secondary clutches, or after the first drive 2 and the second drive 3 are triggered at the same time, the two secondary clutches are locked by the synchronizer 7 under the action of the mechanical structure. The synchronizer 7 here refers to an element that can synchronize the first secondary clutch 4 and the second secondary clutch 6. The synchronizer may be an ordinary mechanical synchronizer 7 or an electronic synchronizer 7, as long as the synchronization of the first secondary clutch 4 and the second secondary clutch 6 can be achieved.

Figure 2:
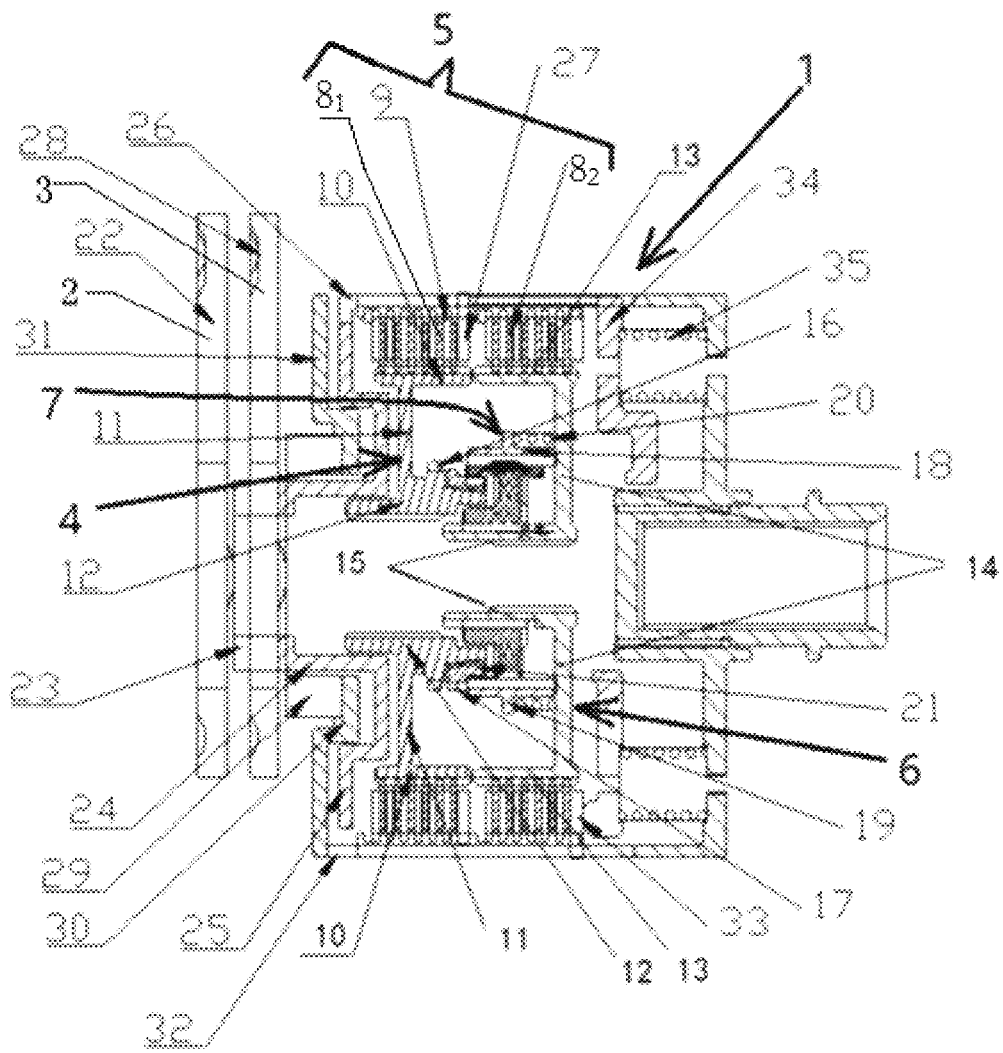
FIG. 2 is a structural schematic diagram of an implementation of the present application.

In the second embodiment, as shown in FIG. 2, the friction unit 5 includes a clutch friction plate $8_1$ connected to the first secondary clutch 4 or the second secondary clutch 6 and a steel plate 9 fixedly connected to the primary clutch 1. The first secondary clutch 4 includes a first horizontal plate 10 connected to the clutch friction plate $8_1$, and the first horizontal plate 10 is connected to a first connecting plate 12 through a first vertical plate 11; the second secondary clutch 6 includes a second horizontal plate 13 connected to the clutch friction plate $8_2$, and the second horizontal plate 13 is connected to a second connecting plate 15 through a second vertical plate 14; the first connecting plate 12 is provided with a first clamping ring 16, the second connecting plate 15 is provided with a second clamping ring 17, and the synchronizer 7 is arranged on one side of the first clamping ring 16 and the second clamping ring 17; the synchronizer 7 includes a synchronizing ring 18, the side part of the synchronizing ring 18 is provided with a return ring 19, and the return ring 19 is configured to abut against the second vertical plate 14 through an elastic piece 20; the first clamping ring 16 and the second clamping ring 17 are configured to adjacently abut against the synchronizer 7; the elastic piece 20 is arranged between the return ring 19 and the second vertical plate 14; the elastic piece 20 is a spring; a side joint ring 21 is arranged on the second connecting plate 15, and the side joint ring 21 is connected with the second clamping ring 17; the synchronizer 7 is provided with splines, and the first clamping ring 16 and the second clamping ring 17 are provided with clamping keys configured to be clamped with the splines; the clamping keys are provided with conical teeth arranged obliquely. The first drive 2 includes a first release lever 22, the first release lever 22 is configured to cooperate with a first release bearing 23, the first release bearing 23 is connected with a first connecting rod 24, and the first connecting rod 24 penetrates through the primary clutch 1 and is connected with the first secondary clutch 4. The first connecting rod 24 includes a first vertical separation rod 25 connected with the first release bearing 23, the first vertical separation rod 25 is connected with a first transverse separation rod 26 extending in the moving direction of the first vertical separation rod 25, the first transverse separation rod 26 is connected with a first transmission separation rod 27, the first transmission separation rod 27 is configured to penetrate through the primary clutch 1, and the first transmission separation rod 27 is connected with the first secondary clutch 4. The first transverse separation rod 26 is embedded in the primary clutch 1. The second drive 3 includes a second release lever 28, the second release lever 28 is configured to cooperate with a second release bearing 29, the second release bearing 29 is connected with a second connecting rod 30, and the second connecting rod 30 penetrates through the primary clutch 1 and is connected with the second secondary clutch 6. The second connecting rod 30 includes a second vertical separation rod 31 connected with the second release bearing 29, the second vertical separation rod 31 is connected with a second transverse separation rod 32 extending in the moving direction of the second vertical separation rod 31, the second transverse separation rod 32 is connected with a second transmission separation rod 33, the second transmission separation rod 33 is configured to penetrate through the primary clutch 1, and the second transmission separation rod 33 is connected with the second secondary clutch 6. The second transverse separation rod 32 is embedded in the primary clutch 1. The vehicle clutch further includes a clutch pressure plate 34, the clutch pressure plate 34 is configured to abut against the second secondary clutch unit, and a pressure spring 35 is arranged between the clutch pressure plate 34 and the primary clutch 1.

This embodiment is a purely mechanical implementation selected on the basis of the first embodiment. The specific linkage mode of the first secondary clutch unit is basically the same as the specific linkage mode of the second secondary clutch unit. Therefore, only the linkage mode of the first secondary clutch unit is illustrated, and the others are the same as the first embodiment. The first drive 2 drives the first connecting rod 24 to act, the first connecting rod 24 drives the steel plate 9 to complete the separation, then the first horizontal plate 10 acts, the first horizontal plate 10 drives the first vertical plate 11 to act, the first vertical plate 11 drives the first connecting plate 12 to act, and then the combination or separation of the friction part is completed. As for the combiner part, first, the friction plate $8_2$ on the second horizontal plate 13 is separated from the steel plate 9, then the second vertical plate 14 drives the second clamping ring 17 to act, then the friction plate $8_1$ on the first horizontal plate is separated from the steel plate, then the first vertical plate drives the first clamping ring 16 to act, and since the first clamping ring 16 and the second clamping ring 17 are separated at the same time, the synchronizer 7 enters a space between the first clamping ring 16 and the second clamping ring 17 to complete the clamping locking operation.

All embodiments in the description are described progressively, the same and similar parts between the various embodiments can be referred to each other, and each embodiment focuses on the differences from other embodiments. In particular, as far as a system embodiment is concerned, as it is substantially similar to a method embodiment, the description is relatively simple, and for related parts, please refer to the part of description of the method embodiment.

The above is merely the embodiments of the present application and is not used to limit the present application. For those skilled in the art, various modifications and changes can be made to the present application. Any modification, equivalent replacement, improvement, etc. made within the spirit and principle of the present application shall be included in the scope of the claims of the present application.

The invention claimed is:

1. A vehicle clutch, comprising:
a first secondary clutch unit and a second secondary clutch unit;
a first drive and a second drive, wherein the first drive drives the first secondary clutch unit and the second drive drives the second secondary clutch unit; and
a synchronizer,
wherein:
the first secondary clutch unit comprises a first secondary clutch with a friction unit configured to cooperate with the first secondary clutch,
the second secondary clutch unit comprises a second secondary clutch with a friction unit configured to cooperate with the second secondary clutch, and
the synchronizer is provided between the first secondary clutch and the second secondary clutch and is configured to combine the first secondary clutch and the second secondary clutch when a specified condition is met.

2. The vehicle clutch according to claim 1, wherein at least one of:
the friction unit of the first secondary clutch comprises a clutch friction plate and a steel plate, and
the friction unit of the second secondary clutch comprises a clutch friction plate and a steel plate.

3. The vehicle clutch according to claim 2, wherein:
the first secondary clutch comprises a first horizontal plate connected to the clutch friction plate and the first horizontal plate is connected to a first connecting plate through a first vertical plate,
the second secondary clutch comprises a second horizontal plate connected to the clutch friction plate and the second horizontal plate is connected to a second connecting plate through a second vertical plate,
the first connecting plate is provided with a first clamping ring and the second connecting plate is provided with a second clamping ring,
the synchronizer is arranged aside the first clamping ring and the second clamping ring,
the synchronizer comprises a synchronizing ring, a side part of which is provided with a return ring configured to abut against the second vertical plate through an elastic piece,
the first clamping ring and the second clamping ring are configured to adjacently abut against the synchronizer,
a side joint ring is arranged on the second connecting plate and is connected with the second clamping ring,
the synchronizer is provided with splines, and
the first clamping ring and the second clamping ring are provided with clamping keys configured to be clamped with the splines, the clamping keys being provided with conical teeth arranged obliquely.

4. The vehicle clutch according to claim 3, wherein:
the first drive comprises a first release lever configured to cooperate with a first release bearing,
the first release bearing is connected with a first connecting rod, and
the first connecting rod is connected with the first secondary clutch.

5. The vehicle clutch according to claim 4, wherein:
the first connecting rod comprises a first vertical separation rod connected with the first release bearing,
the first vertical separation rod is connected with a first transverse separation rod extending in the moving direction of the first vertical separation rod,
the first transverse separation rod is connected with a first transmission separation rod,
the first transmission separation rod is connected with the first secondary clutch.

6. The vehicle clutch according to claim 3, wherein:
the second drive comprises a second release lever,
the second release lever is configured to cooperate with a second release bearing,
the second release bearing is connected with a second connecting rod, and
the second connecting rod is connected with the second secondary clutch.

7. The vehicle clutch according to claim 6, wherein:
the second connecting rod comprises a second vertical separation rod connected with the second release bearing,
the second vertical separation rod is connected with a second transverse separation rod extending in the moving direction of the second vertical separation rod,
the second transverse separation rod is connected with a second transmission separation rod,
the second transmission separation rod is connected with the second secondary clutch.

8. The vehicle clutch according to claim 1, further comprising a clutch pressure plate, the clutch pressure plate is configured to abut against the first secondary clutch unit or the second secondary clutch unit, and a pressure spring.

* * * * *